US011467413B2

(12) United States Patent
    Kamakura

(10) Patent No.: US 11,467,413 B2
(45) Date of Patent: Oct. 11, 2022

(54) WEARABLE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 236 days.

(21) Appl. No.: 16/879,836

(22) Filed: May 21, 2020

(65) Prior Publication Data

US 2020/0371364 A1    Nov. 26, 2020

(30) Foreign Application Priority Data

May 22, 2019 (JP) .............................. JP2019-095792

(51) Int. Cl.
    *G02B 27/01*    (2006.01)
(52) U.S. Cl.
    CPC ..... *G02B 27/0176* (2013.01); *G02B 27/0172* (2013.01); *G02B 2027/0154* (2013.01); *G02B 2027/0178* (2013.01)
(58) Field of Classification Search
    None
    See application file for complete search history.

(56) References Cited

U.S. PATENT DOCUMENTS

2009/0168131 A1*  7/2009  Yamaguchi ........ G02B 27/0176
                                                         359/9
2011/0069275 A1   3/2011  Ohno et al.

FOREIGN PATENT DOCUMENTS

JP        2011-085929 A       4/2011
JP        2017022668 A    *   1/2017

* cited by examiner

*Primary Examiner* — Michelle M Iacoletti
*Assistant Examiner* — Danell L Owens
(74) *Attorney, Agent, or Firm* — Oliff PLC

(57) ABSTRACT

A wearable display device includes an optical device configured to form a virtual image, and a support device configured to support the optical device. The support device includes a first side support including a first temple, a second side support including a second temple, and a front frame extending between tip portions of the first side support and the second side support. The support device includes a flexible member between the tip portion of the first side support and a first end of the front frame and between the tip portion of the second side support and a second end of the front frame. The flexible members cause an interval between the tip portion of the first side support and the tip portion of the second side support to be changeable.

13 Claims, 12 Drawing Sheets

WEARABLE DISPLAY DEVICE

The present application is based on, and claims priority from JP Application Serial Number 2019-095792, filed May 22, 2019, the disclosure of which is hereby incorporated by reference herein in its entirety.

BACKGROUND

1. Technical Field

The present disclosure relates to a wearable display device that presents a virtual image to an observer.

2. Related Art

As a wearable display device, there is a device that has an eyeglasses-like external appearance and that includes left and right display devices and a pair of temples provided for supporting the display devices. In addition, as a device similar to the wearable display device, there are image viewing eyeglasses for viewing a display that displays a right-eye image and a left-eye image. As this type of image viewing eyeglasses, image viewing eyeglasses are known which include a frame portion having openings corresponding to left and right eyes, left and right temple holders coupled to left and right sides of the frame portion via hinge portions, and temples coupled to the respective temple holders, and in which opening angles of the left and right temples, that is, an opening amount between tips of the temples is adjustable (JP-A-2011-85929).

Even though the opening amount of the temples can be adjusted in the device disclosed in JP-A-2011-85929, the device is unable to be used in some circumstances, not only relating to the size of a wearer's head but also to various configurations relating to the position of each part such as the nose, the ears and the like.

SUMMARY

A wearable display device according to an aspect of the present disclosure includes an optical device configured to form a virtual image, and a support device configured to support the optical device. The support device includes a first side support including a first temple, a second side support including a second temple, and a front frame extending between tip portions of the first side support and the second side support. The support device includes flexible members between the tip portion of the first side support and a first end of the front frame and between the tip portion of the second side support and a second end of the front frame. The flexible members cause an interval between the tip portion of the first side support and the tip portion of the second side support to be changeable.

DESCRIPTION OF EXEMPLARY EMBODIMENTS

First Embodiment

A first embodiment of a wearable display device according to the present disclosure will be described below with reference to the accompanying drawings.

Figure 1:
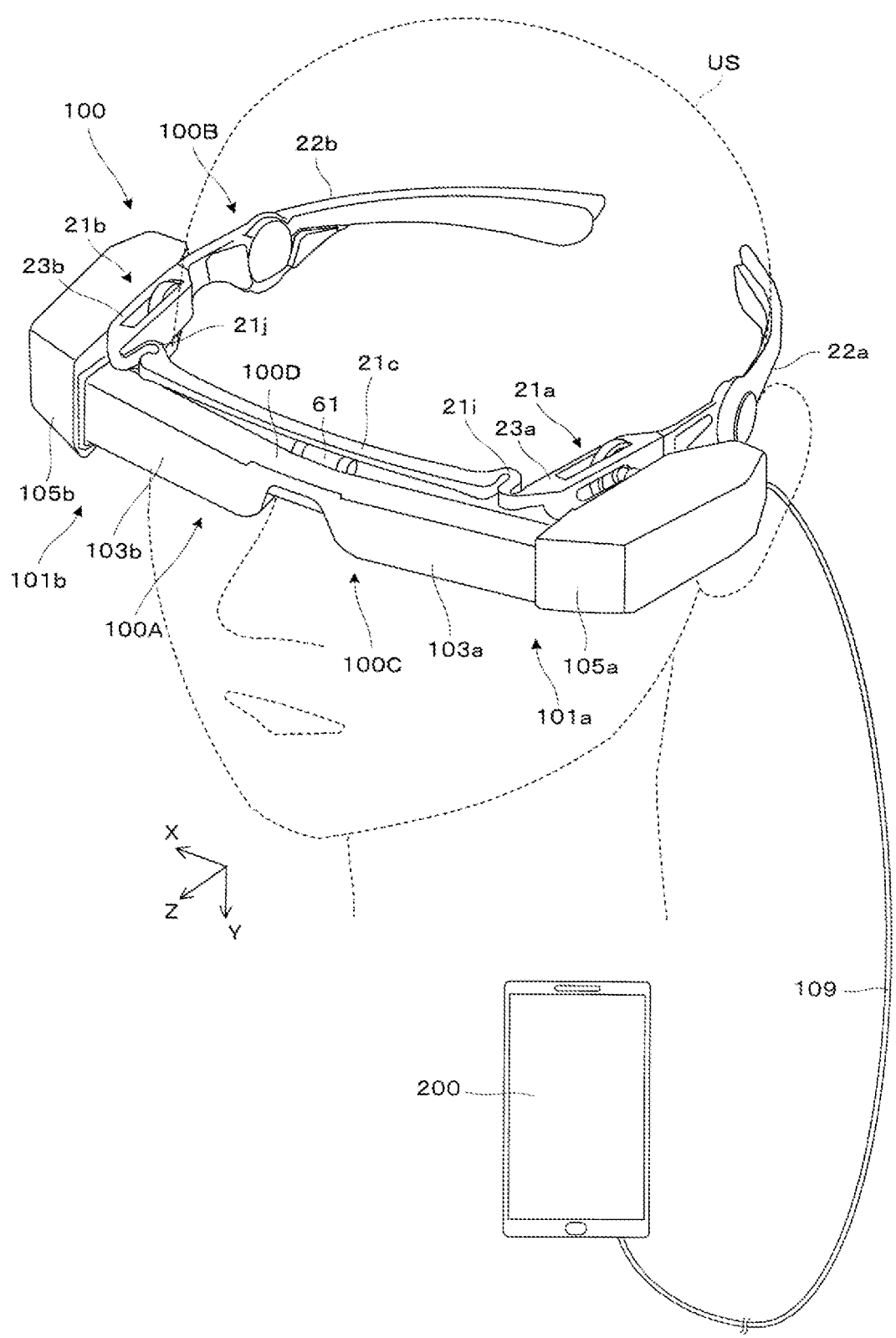
FIG. 1 is a perspective view describing a usage state of a wearable display device according to a first embodiment.
Figure 2:
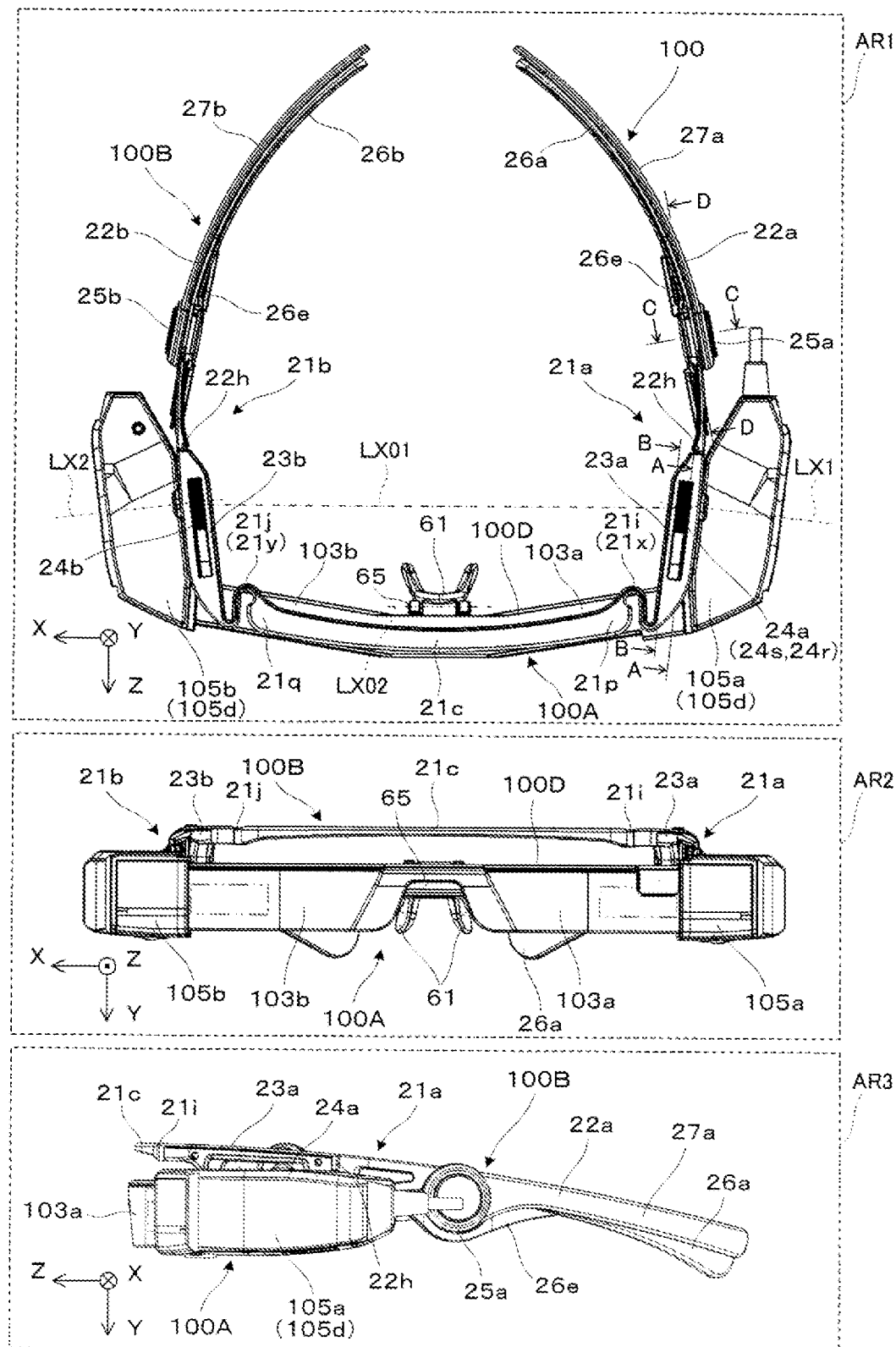
FIG. 2 is a series of diagrams describing a specific example of an external appearance of the wearable display device.

As illustrated in FIG. 1 and FIG. 2, a wearable display device 100 of the first embodiment is a head-mounted display (HMD) having an eyeglasses-like external appearance. In FIG. 1 and the like, X, Y, and Z are an orthogonal coordinate system, a positive X direction corresponds to a lateral direction in which both eyes of an observer or wearer US wearing the wearable display device 100 are aligned side by side, a positive Y direction corresponds to a downward direction orthogonal to the lateral direction in which both the eyes of the wearer US are aligned side by side, and a positive Z direction corresponds to a forward direction or a front direction of the wearer US. In FIG. 2, a first region AR1 is a plan view of the wearable display device 100, a second region AR2 is a front view of the wearable display device 100, and a third region AR3 is a left side view of the wearable display device 100.

The wearable display device 100 not only allows a virtual image to be visually recognized by the observer or wearer US wearing the wearable display device 100, but also allows an external world image to be observed by the observer or wearer US in a see-through manner. The wearable display device 100 can be communicatively coupled to an external device 200, such as a smartphone, via a cable 109, and can form a virtual image corresponding to an image signal input from the external device 200, for example.

Figure 3:
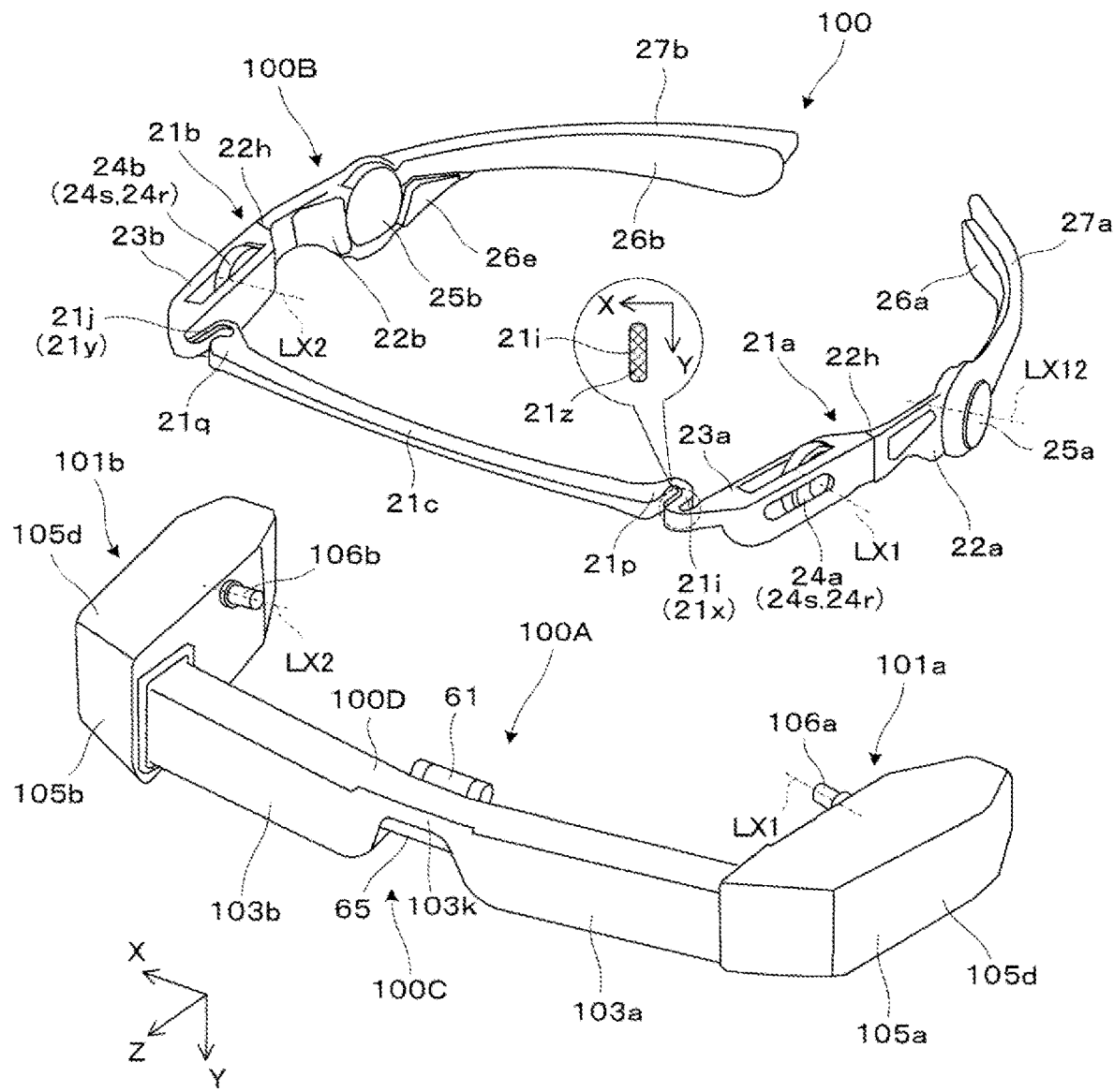
FIG. 3 is an exploded perspective view describing a structure of the wearable display device.

As illustrated in FIG. 3, the wearable display device 100 includes, as structural elements, an optical device 100A that forms the virtual image, and a support device 100B that supports the optical device 100A. In this case, the support device 100B is supported on the head of the wearer US in a stable state, and the optical device 100A can be fixed while being aligned with the support device 100B.

The optical device 100A is provided with a first display device 101a and a second display device 101b. The first display device 101a and the second display device 101b are portions that respectively form a virtual image for a left eye and a virtual image for a right eye. The first display device 101a for the left eye is provided with a first virtual image forming optical portion 103a that transparently covers the front of the eye of the observer, and a first image forming main body portion 105a that forms imaging light. The second display device 101b for the right eye is provided with a second virtual image forming optical portion 103b that transparently covers the front of the eye of the observer, and a second image forming main body portion 105b that forms the imaging light. Each of the virtual image forming optical portions 103a and 103b includes a light guide formed of a resin material or the like, and each of the image forming main body portions 105a and 105b houses optical components and electronic components in an outer case 105d formed of a magnesium alloy or the like. A boss 106a, which is a shaft member, is provided on the outer case 105d as a portion associated with a movable mechanism 24a, which will be described below.

The support device 100B includes a first side support 21a including a first temple 22a, a second side support 21b including a second temple 22b, and a front frame 21c extending between tip portions 23a and 23b of the first side support 21a and the second side support 21b. Here, the tip portion 23a of the first side support 21a functions as a left frame base portion that supports one end of the front frame 21c, and the tip portion 23b of the second side support 21b functions as a right frame base portion that supports the other end of the front frame 21c. The front frame 21c and the tip portions (the frame base portions) 23a and 23b extend substantially along a reference plane parallel to an XZ plane. The front frame 21c and the tip portions (the frame base portions) 23a and 23b form an integral component, and substantially the whole thereof, except for portions such as a screw and a pin, is formed of a resin material, for example. However, the integral component may be formed of a metal material, or may be formed by a metal core member coated with a resin material.

The support device 100B includes a flexible member 21i between the front frame 21c and the tip portion 23a of the first side support 21a, and includes a flexible member 21j between the front frame 21c and the tip portion 23b of the second side support 21b. The flexible members 21i and 21j are formed of a resin or the like and have flexibility so that an interval between the tip portion 23a of the first side support 21a and the tip portion 23b of the second side support 21b is changeable. The flexible members 21i and 21j allow not only the interval between the tip portions 23a and 23b, but also relative angle thereof to be changeable, thereby allowing minute twists and bends of the tip portions 23a and 23b. When the interval between the tip portion 23a of the first side support 21a and the tip portion 23b of the second side support 21b is forcibly widened, the flexible members 21i and 21j cause the interval to return to the original interval using a restoring force generated by the elasticity thereof. The flexible member 21i provided in the tip portion 23a is a first spring member 21x having an S-shaped external shape in plan view, and is smoothly bent at two or more locations so as to have a curvature. As a result, a relatively significant displacement can be made between relative positions of both ends of the flexible member 21i. Further, the flexible member 21j provided in the tip portion 23b is a second spring member 21y having an S-shaped external shape in plan view, and is bent so as to have a curvature. As a result, a relatively significant displacement can be made between relative positions of both ends of the flexible member 21j. As illustrated while being partially enlarged in FIG. 3, the first spring member 21x has a cross section 21z that extends along the reference plane parallel to the XZ plane and that is relatively long in the Y direction orthogonal to the reference plane. Similarly, the second spring member 21y has a cross section that extends along the reference plane parallel to the XZ plane and that is relatively long in the Y direction orthogonal to the reference plane. The first spring member 21x couples the tip portion 23a of the first side support 21a with a first end 21p of the front frame 21c, and the second spring member 21y couples the tip portion 23b of the second side support 21b with a second end 21q of the front frame 21c. In this case, the first spring member 21x and the second spring member 21y are formed as flat spring-shaped coupling members, and can increase a degree of freedom for an adjustment of the interval and the like with a simple structure.

In the left-side first side support 21a, the first temple 22a located to the rear can be folded inward toward the head of the wearer US, with respect to the tip portion 23a, using a hinge 22h. In addition, in the right-side second side support 21b, the second temple 22b located in the rear can be folded inward toward the head of the wearer US, with respect to the tip portion 23b, using the hinge 22h. Substantially the whole of the temples 22a and 22b are formed, for example, of a resin material, except for portions such as a spring, but may be formed of a metal material, or may be formed by a metal core member coated with a resin material.

The first temple 22a and the second temple 22b are suspended over the ears of the wearer US. The optical device 100A includes a nose pad 61 that is placed on the nose of the wearer US at a location corresponding to the center of the front frame 21c, that is, behind a recess formed in a center portion or bridge portion 103k sandwiched between the first virtual image forming optical portion 103a and the second virtual image forming optical portion 103b. The temples 22a and 22b and the nose pad 61 are portions for stably securing a wearing state of the wearable display device 100 with respect to the head of the wearer US, and configure wearing contact portions.

The support device 100B includes the movable mechanism 24a, which displaceably supports the optical device 100A or the first display device 101a with respect to the support device 100B, in the tip portion 23a of the left-side first side support 21a. The movable mechanism 24a functions as a movement mechanism 24s that supports the optical device 100A or the first display device 101a so that the optical device 100A or the first display device 101a can move, with respect to the support device 100B, in a front-rear direction corresponding to an optical axis direction, that is, in positive and negative Z directions, and also functions as a rotation mechanism 24r that supports the optical device 100A or the first display 101a so that the optical device 100A or the first display 101a can rotate about a lateral axis LX1 orthogonal to an optical axis. The movable mechanism 24a also has a function of increasing or decreasing an interval, that is, a distance in the X direction, between the first side support 21a and the second side support 21b.

The first temple 22a of the first side support 21a includes a fixed temple 26a extending substantially parallel to the XZ plane, and a movable temple 27a that is movable relative to the fixed temple 26a and upwardly positionable relative to the fixed temple 26a with a V-shaped angle formed therebetween. A temple adjustment mechanism 25a is provided at the base of the fixed temple 26a for rotatably supporting the movable temple 27a and for adjusting an opening angle of the movable temple 27a with respect to the fixed temple 26a in stages and fixing the opening angle. An ear pad 26e is attached to the fixed temple 26a at a position below the temple adjustment mechanism 25a, that is, a position adjacent to the temple adjustment mechanism 25a in the positive Y direction. The ear of the wearer US comes into contact with a portion of the ear pad 26e below and to the rear of the temple adjustment mechanism 25a, so that the temple adjustment mechanism 25a and the like are supported by the ear. The fixed temple 26a and the movable temple 27a are curved inward toward the head of the wearer US, and have flexibility so as to fit to the size and the shape of the back of the head.

The support device 100B includes the movable mechanism 24b, which displaceably supports the optical device 100A or the second display 101b with respect to the support device 100B, in the tip portion 23b of the right-side second side support 21b. The movable mechanism 24b functions as the movement mechanism 24s that supports the optical device 100A or the second display device 101b so that the optical device 100A or the second display device 101b can move with respect to the support device 100B in the front-rear direction corresponding to the optical axis direction, namely, in the positive and negative Z directions, and also functions as the rotation mechanism 24r that supports the optical device 100A or the second display 101b so that the optical device 100A or the second display 101b can rotate about a lateral axis LX2 orthogonal to the optical axis. The movable mechanism 24b also has the function of increasing or decreasing the interval, that is, the distance in the X direction between the first side support 21a and the second side support 21b. Note that the movable mechanism 24b of the second side support 21b operates as an overall adjustment mechanism with respect to the wearing state of the wearable display device 100, in cooperation with the movable mechanism 24a of the first side support 21a. Further, the movable mechanism 24b allows a front-rear positional adjustment by which the optical device 100A is caused to move forward or rearward in stages or continuously in the front-rear direction, that is, the positive Z direction and the negative Z direction, with respect to the support device 100B or the head of the wearer US, and also allows a tilt angle adjustment by which a posture of the optical device 100A is caused to be tilted in stages or continuously by the optical device 100A being rotated about a lateral horizontal axis LX01 (see FIG. 2) extending in the X direction with respect to the support device 100B or the head of the wearer US. As a result, a distance from the eyes of the wearer US to the optical device 100A can be adjusted by the movable mechanisms 24a and 24b provided in the pair of side supports 21a and 21b. Further, by using the movable mechanisms 24a and 24b, the height of the virtual image forming optical portions 103a and 103b, that is, the positioning thereof in the positive Y direction and the negative Y direction in relation to the front frame 21c can be adjusted with respect to the eyes of the wearer US, and also tilt postures of the virtual image forming optical portions 103a and 103b, that is, rotational postures thereof about the X axis can be adjusted with respect to the eyes of the wearer US. Note that the front-rear positional adjustment and the tilt angle adjustment of the optical device 100A by the movable mechanisms 24a and 24b are semi-fixed by mechanical elements, which will be described in detail below, so that the front-rear position and the tilt angle do not change unless the wearer US applies an external force of a certain amount or greater.

The second temple 22b of the second side support 21b includes a fixed temple 26b extending substantially parallel to the XZ plane, and a movable temple 27b that is movable relative to the fixed temple 26b and upwardly positionable relative to the fixed temple 26b with a V-shaped angle formed therebetween. A temple adjustment mechanism 25b is provided at the base of the fixed temple 26b for rotatably supporting the movable temple 27b and for adjusting an opening angle of the movable temple 27b with respect to the fixed temple 26b in stages or continuously and fixing the opening angle. The ear pad 26e is attached to the fixed temple 26b in the same manner as in the case of the first temple 22a. Further, the fixed temple 26a and the movable temple 27a are curved inward and have flexibility in the same manner as in the case of the first temple 22a. As a result, the wearer US can wear the wearable display device 100 in a manner in which the first temple 22a and the second temple 22b snugly fit the back of the head of the wearer US. Note that the opening angle adjustments of the movable temples 27a and 27b by the temple adjustment mechanisms 25a and 25b are semi-fixed by the mechanical elements, which will be described in detail below, so that the opening angles do not change unless the wearer US performs a predetermined operation.

The optical device 100A includes a pad support device 65, which sets the positioning of the nose pad 61 while keeping the positioning changeable, in the center portion or the bridge portion 103k sandwiched between the first and second virtual image forming optical portions 103a and 103b. The pad support device 65 supports the nose pad 61 such that the nose pad can be displaced with respect to the optical device 100A or the virtual image forming optical portions 103a and 103b. In other words, the pad support device 65 provided between the optical device 100A and the nose pad 61 sets the positioning of the nose pad 61 while keeping the positioning changeable. In this case, the height of the optical device 100A with respect to the face of the wearer US, and the interval, are easily adjusted. By the pad support device 65, the nose pad 61 is displaced continuously or in stages vertically in the positive Y direction and the negative Y direction with respect to the optical device 100A or the virtual image forming optical portions 103a and 103b, and is supported in a state in which the position thereof can be adjusted with respect to the height position. In other words, the pad support device 65 makes it possible to freely set a distance from the optical device 100A to the nose pad 61. Further, by the pad support device 65, the nose pad 61 is supported in a state in which the nose pad 61 can be rotated in stages or continuously about a lateral horizontal axis LX02 extending in the X direction with the base side of the nose pad 61 being the center of the rotation, and the rotational posture thereof can be adjusted with respect to the tilted state thereof. In other words, the pad support device 65 makes it possible to freely set the rotational posture of the nose pad 61. As a result, the positioning of the virtual image forming optical portions 103a and 103b including the postures thereof can be changed with respect to the eyes of the wearer US in the vertical direction, that is, the positive Y direction and the negative Y direction and in the front-rear direction, that is, the positive Z direction and the negative Z direction. Note that the positioning adjustment including the posture of the nose pad 61 by the pad support device 65 is semi-fixed by the mechanical elements, which will be described in detail below, so that the positioning does not change unless the wearer US applies an external force of a certain amount or greater.

Figure 4:
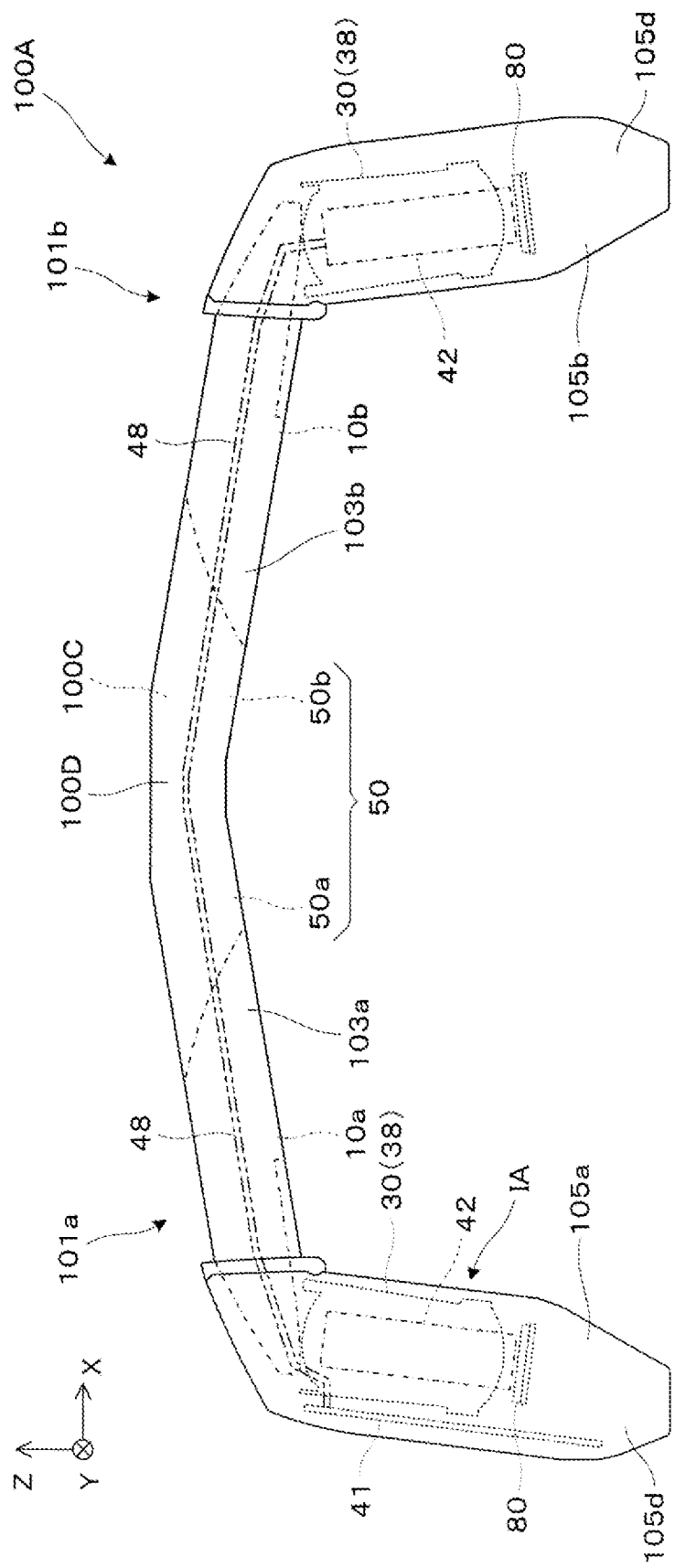
FIG. 4 is a plan view describing an optical device of the wearable display device.

Next, the internal structure and the like of the optical device 100A will be described with reference to FIG. 4. The first image forming main body portion 105a for the left eye holds a display element 80, a projection lens 30, electronic printed wired boards 41 and 42, and the like, in the outer case 105d. A lens barrel 38, which configures the external appearance of the projection lens 30, aligns a lens element and the display element 80, which configure the projection lens 30, to each other and fixes them. The display element 80, the projection lens 30, and the electronic printed wired boards 41 and 42 are fixed in the metal outer case 105d in an aligned state via an attachment member (not illustrated), and in particular, the projection lens 30 is fixed in a state of also being aligned with a tip portion of the first virtual image forming optical portion 103a. The projection lens 30 is positioned upstream in an optical path with respect to the first virtual image forming optical portion 103a, and configures a part of an imaging system. The electronic printed wired board 41 is a signal processing board that processes signals including information from the external device 200 illustrated in FIG. 1. The electronic printed wired board 41 functions as an interface with the external device 200, and manages and controls a display operation of the electronic printed wired board 42. The electronic printed wired board 42 is a drive printed wired board that drives the display element 80 in the first image forming main body portion 105a, and operates under the control of the electronic printed wired board 41.

The second image forming main body portion 105b for the right eye holds the display element 80, the projection lens 30, the electronic printed wired board 42, and the like, in the cover-like outer case 105d. The projection lens 30, the display element 80, and the electronic printed wired board 42 are fixed in the metal outer case 105d in an aligned state, and in particular, the projection lens 30 is fixed in a state of being also aligned with a tip portion of the second virtual image forming optical portion 103b. In the second image forming main body portion 105b, the projection lens 30 is positioned upstream in the optical path with respect to the second virtual image forming optical portion 103b, and configures a part of the imaging system. The electronic printed wired board 42 is a drive printed wired board that drives the display element 80 in the second image forming main body portion 105b, and operates under the control of the electronic printed wired board 41 provided separately in the first image forming main body portion 105a.

The first and second virtual image forming optical portions 103a and 103b are not separate portions, but form a transparent light guiding unit 100C that is an integrated member formed as a result of the first and second virtual image forming optical portions 103a and 103b being coupled to each other at opposing ends thereof. The transparent light guiding unit 100C includes a pair of light guiding members 10a and 10b that guide image light from the display elements 80, and a center member 50 that allows a superimposed view of the external world image. The pair of light guiding members 10a and 10b are a pair of optical members that contribute to virtual image formation while internally propagating the image light. The center member 50 includes a pair of light transmission portions 50a and 50b, the light transmission portion 50a being joined to the light guiding member 10a, and the light transmission portion 50b being joined to the light guiding member 10b. The transparent light guiding unit 100C is a complex light guiding device that provides an image for both the eyes of the wearer US by guiding light, and both of ends, namely, tips of the light guiding members 10a and 10b are fitted into the outer cases 105d and supported by the image forming main body portions 105a and 105b.

An upper cover 100D is fixed to an upper surface of the transparent light guiding unit 100C. A thin and narrow space is formed between the upper cover 100D and the transparent light guiding unit 100C, and a signal line 48 extends therein that electrically couples the first image forming main body portion 105a and the second image forming main body portion 105b.

The display element 80 integrated in the first image forming main body portion 105a is a light-emitting display device that enables two-dimensional display and operates under a dot-matrix system. Specifically, it is assumed that each of the display elements 80 is an organic electro-luminescence (EL) display panel, but it is not limited to this example and may be a panel for a liquid crystal display (LCD). When the panel for the LCD is used, a compatible illumination source is required. As a result of being driven by the electronic printed wired board 42, the display element 80 forms a color image on a rectangular display surface, and can display a two-dimensional video or still image thereon.

Figure 5:
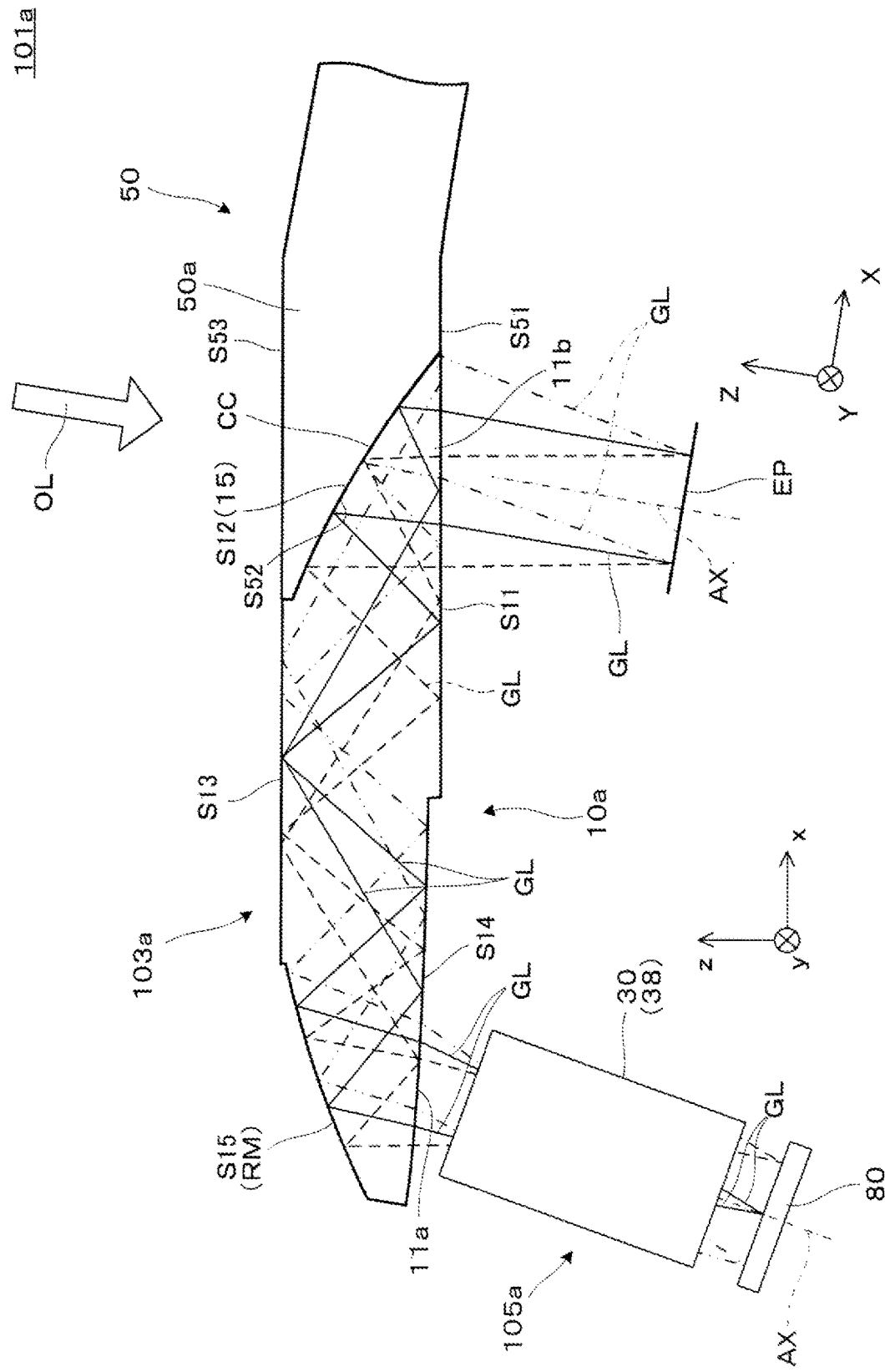
FIG. 5 is a plan view describing an optical structure of a first virtual image forming optical portion.

FIG. 5 is a diagram illustrating a part of the first display device 101a, and particularly describes an optical structure of the first virtual image forming optical portion 103a. As described above, the wearable display device 100 is configured by the first display device 101a and the second display device 101b (see FIG. 1 and the like), but since the first display device 101a and the second display device 101b have the same left-right symmetric structure, only the first display device 101a will be described, and a description of the first display device 101b will be omitted. Note that in FIG. 5, x, y, and z are an orthogonal coordinate system, x and y directions are parallel to a first surface S11 and a third surface S13, and a z direction is perpendicular to the first surface S11 and the third surface S13.

The light guiding member 10a of the first virtual image forming optical portion 103a is joined to the light transmission portion 50a via an adhesive layer CC. In other words, a second transmission surface S52 of the light transmission portion 50a is disposed so as to face a second surface S12 of the light guiding member 10a, and has the same shape as the second surface S12. The light guiding member 10a and the light transmission portion 50a each have a structure obtained by coating a surface of a main body member including an optical surface, which provides a three-dimensional shape, with a thin hard coat layer. The main body members of the light guiding member 10a and the light transmission portion 50a are formed of a resin material having high optical transparency in a visible range, and are formed, for example, by pouring a thermoplastic resin into a mold and solidifying the resin.

An optical path of image light GL will be briefly described below. The light guiding member 10a guides the image light GL emitted from the projection lens 30 toward the eye of the wearer US, by reflecting the image light GL using first to fifth surfaces S11 to S15, and the like. Specifically, the image light GL from the projection lens 30 is first incident on the fourth surface S14 formed on a light incidence portion 11a and is reflected by the fifth surface S15 that is an inner surface of a reflection film RM, is incident again from the inner side on the fourth surface S14 and is totally reflected, is incident on and totally reflected by the third surface S13, and is incident on and totally reflected by the first surface S11. The image light GL totally reflected by the first surface S11 is incident on the second surface S12, is partially reflected while being partially transmitted through a half mirror 15 provided on the second surface S12, and is once more incident on and passes through a portion of the first surface S11 formed on a light emission portion 11b. The image light GL that has passed through the first surface S11 travels as a whole along an optical axis AX substantially parallel to the Z direction and enters an exit pupil EP, at which the eye of the wearer US is positioned, as a substantially parallel luminous flux. In other words, the wearer US observes an image formed by the image light as a virtual image.

The first virtual image forming optical portion 103a is configured to allow the wearer US to visually recognize the image light using the light guiding member 10a, and also to allow, in a state in which the light guiding member 10a and the light transmission part 50a are used in a combined manner, the wearer US to observe the external world image with little distortion. At this time, since the third surface S13 and the first surface S11 are substantially parallel to each other, the diopter becomes approximately 0 in relation to observation realized by transmission through these sections, and almost no aberration or the like occurs in external light OL. Further, a third transmission surface S53 and a first transmission surface S51 are flat surfaces substantially parallel to each other. Furthermore, since the first transmission surface S51 and the first surface S11 are flat surfaces substantially parallel to each other, almost no aberration or the like occurs. As described above, the wearer US observes the external world image having no distortion through the light transmission portion 50a.

Figure 6:
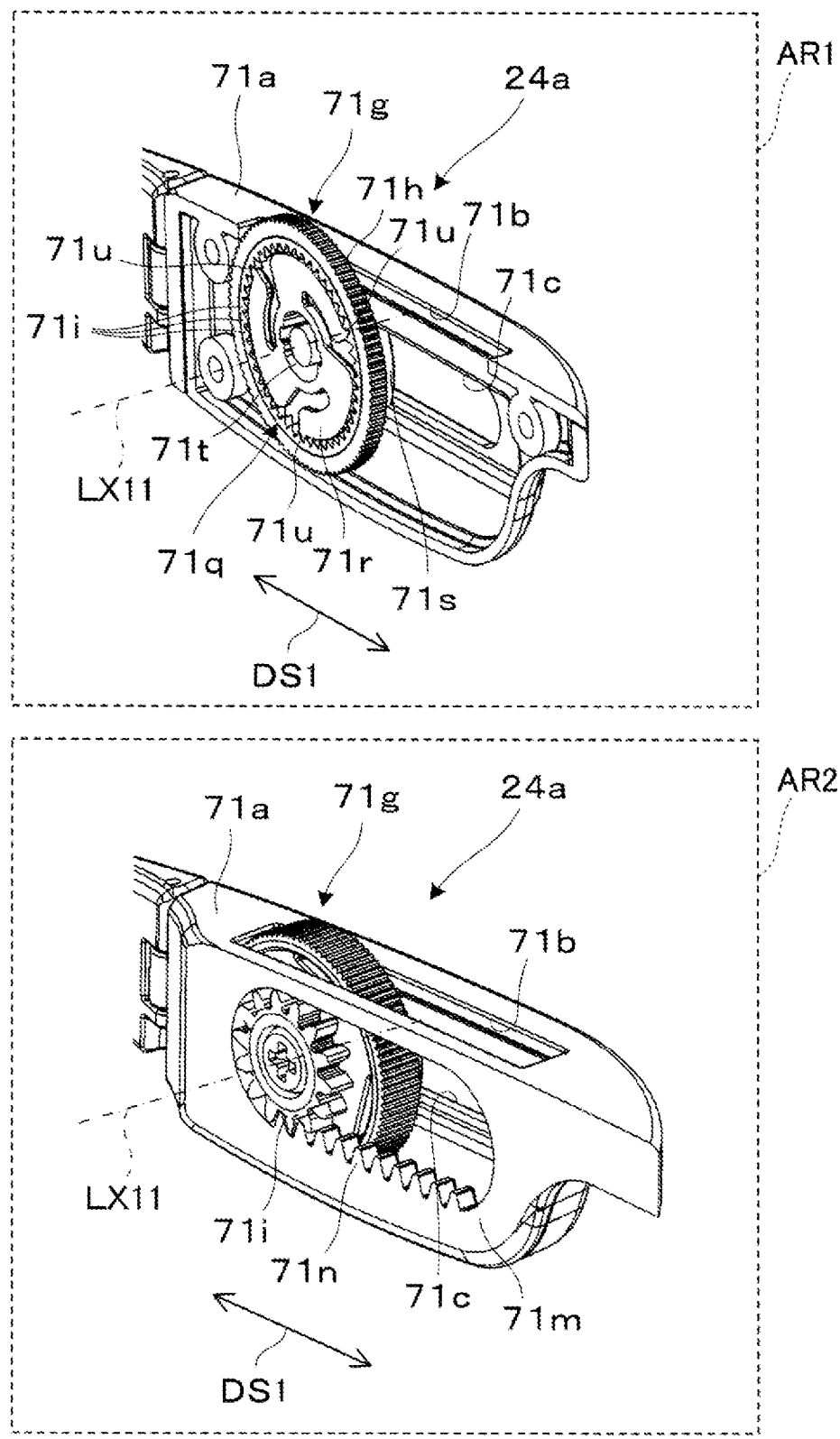
FIG. 6 is a series of perspective views of cross sections, respectively viewed from directions indicated by arrows AA and BB, of an adjustment portion illustrated in FIG. 2.

FIG. 6 is a series of diagrams illustrating a specific example of the internal structure of the movable mechanism 24a provided on the first side support 21a. In FIG. 6, the first region AR1 is a cross section viewed from a direction indicated by arrows AA, of the movable mechanism 24a illustrated in FIG. 2 and a perspective view of the interior thereof, and the second region AR2 is a cross section viewed from a direction indicated by arrows BB, of the movable mechanism 24a illustrated in FIG. 2 and a perspective view of the interior thereof.

As illustrated in FIG. 6, a first rotary member 71g is held in a housing 71a of the movable mechanism 24a provided in the first side support 21a, and an upper portion of a knurled portion 71h of the first rotary member 71g protrudes from an upper slot 71b of the housing 71a. A gear portion 71i of the first rotary member 71g engages with a gear portion 71n of a rack 71m formed in a lower portion of an oblong recess formed in the housing 71a, so as to be able to rotate about a rotation axis LX11 extending substantially parallel to the left right X direction. The first rotary member 71g is movable in a front-rear direction DS1 while being guided by a guide, such as a groove formed in the housing 71a, and moves in the front-rear direction DS1, that is, in the Z direction in accordance with the rotation of the first rotary member 71g operated by a finger. A circular housing space is formed inside the knurled portion 71h coaxially with the knurled portion 71h, and a tooth locking member 71r of a second rotary member 71q is housed therein. The second rotary member 71q includes a hollow center member 71s, which is movable in the front-rear Z direction while being guided by a guide, such as the groove formed in the housing 71a. At this time, the second rotary member 71q also moves in the front-rear Z direction while rotating or without rotating in accordance with the rotational movement of the first rotary member 71g. The boss 106a, which is the shaft member protruding toward the inner side of the outer case 105d of the first image forming main body portion 105a illustrated in FIG. 3, is inserted into a hole 71t of the center member 71s, and the center member 71s and the boss 106a integrally rotate due to the engagement of convex and concave portions. The boss 106a, namely, the first image forming main body portion 105a moves in the front-rear direction DS1, that is, in the Z direction together with the center member 71s, while being guided by an oblong side slot 71c and the like formed in the housing 71a. At this time, a claw 71u formed on the tooth locking member 71r of the second rotary member 71q engages with an inner tooth 71i formed on the inner side of the knurled portion 71h of the first rotary member 71g, and the rotation of the second rotary member 71q with respect to the first rotary member 71g is restricted. However, when a rotational force of a predetermined amount or greater is applied, the tooth locking member 71r deforms and the engagement is temporarily released, thereby allowing the second rotary member 71q to rotate. In other words, the tooth locking member 71r and the knurled portion 71h function as a click engagement structure that achieves a loose lock at a predetermined angle interval. By manually operating and rotating the knurled portion 71h of the first rotary member 71g, the first image forming main body portion 105a supported by the boss (shaft member) 106a can be moved gradually in stages in the front-rear direction while generating a clicking sensation.

Although a detailed description is omitted here, a mechanical structure of the movable mechanism 24b provided in the second side support 21b has the same functions as those of the movable mechanism 24a of the first side support 21a, and the movable mechanism 24b has a structure obtained by laterally reversing the mechanical structure of the movable mechanism 24a.

Figure 7:
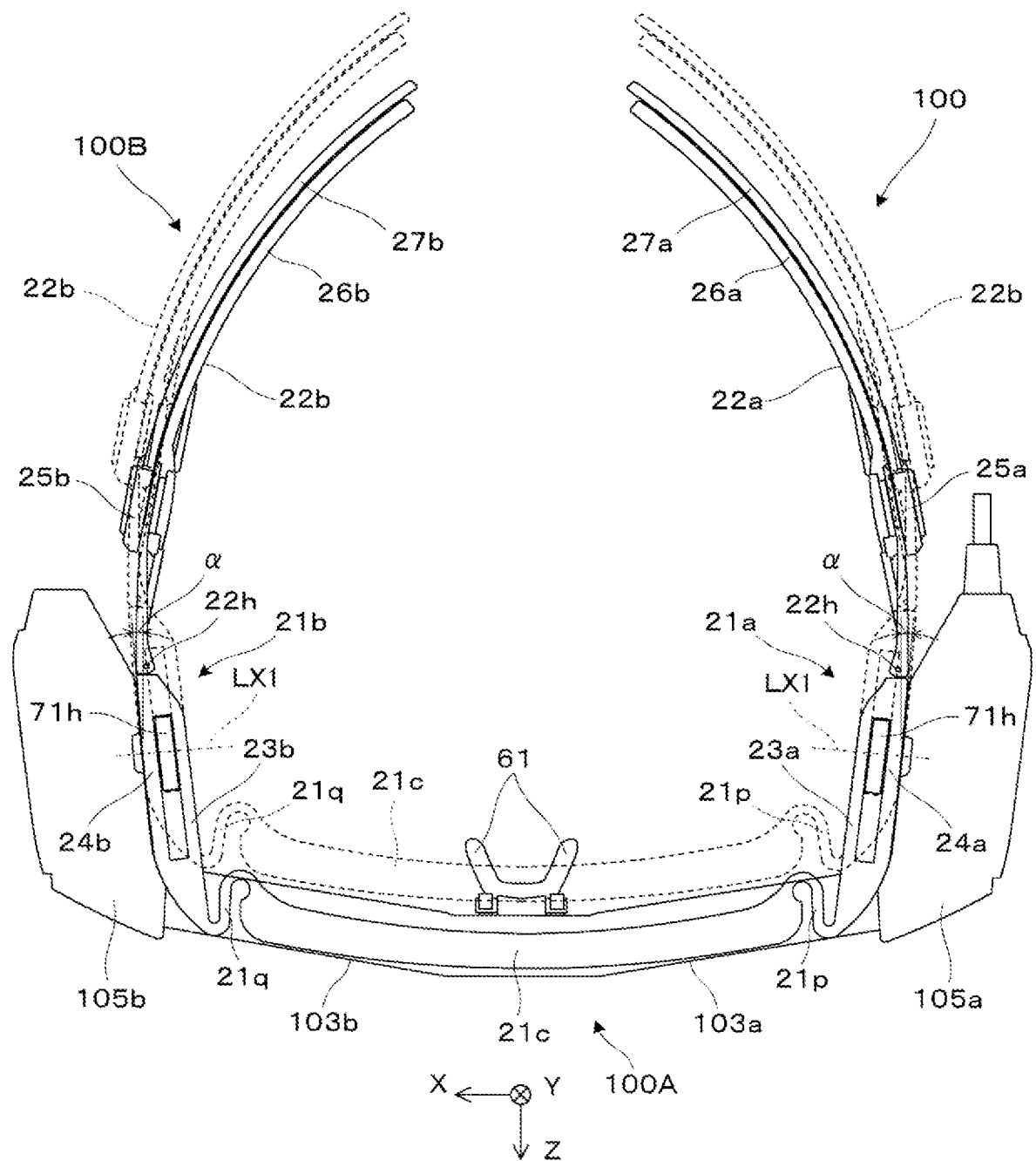
FIG. 7 is a plan view describing forward and rearward movements and a width adjustment of a support device.

FIG. 7 is a plan view illustrating a relative displacement, in the front-rear direction, of the support device 100B with respect to the optical device 100A. The support device 100B illustrated by solid lines in FIG. 7 indicates a state in which the support device 100B is disposed at a frontmost position, and the support device 100B illustrated by dotted lines is disposed at a rearmost position.

By performing an operation of rotating the knurled portions 71h provided in the movable mechanisms 24a and 24b, the tip portion 23a of the first side support 21a can be gradually shifted in the front-rear direction with respect to the first image forming main body portion 105a, and the tip portion 23b of the second side support 21b can be gradually shifted in the front-rear direction with respect to the second image forming main body portion 105b. In other words, the optical device 100A or the display devices 101a and 101b can be moved in the front-rear direction by a desired amount with respect to the support device 100B. At this time, when the support device 100B moves forward with respect to the optical device 100A, the interval between the tip portion 23a of the first side support 21a and the tip portion 23b of the second side support 21b is narrowed. When the support device 100B moves rearward with respect to the optical device 100A, the opposite state to that described above occurs. In other words, by moving the support device 100B relatively forward in the positive Z direction, the interval between the pair of tip portions 23a and 23b is narrowed, and by moving the optical device 100A relatively rearward in the negative Z direction, the interval between the pair of tip portions is widened. Specifically, in the case of the support device 100B positioned as illustrated by the solid lines, the interval in the X direction between the tip portion 23a of the first side support 21a and the tip portion 23b of the second side support 21b is narrowed, but in the case of the support device 100B positioned as illustrated by the dotted lines, the interval in the X direction between the tip portions 23a and 23b is widened. In this way, by moving the support device 100B in the front-rear direction, that is, in the positive Z direction and the negative Z direction, the interval between the tip portions 23a and 23b of the support device 100B is also adjusted so as to be increased or decreased. Here, an increase or decrease amount of the interval between the tip portions 23a and 23b corresponds to a tilt angle α in plan view. For example, when the position illustrated by the dotted lines is a basic position (see the state illustrated by the dotted lines in FIG. 7), when the support device 100B is advanced forward from the dotted line position to the solid line position, the flexible members 21$i$ and 21$j$ are forcibly contracted laterally in the X direction. The flexible members 21$i$ and 21$j$ generate a force that repels compression, and attempt to return the interval between the tip portions 23$a$ and 23$b$ from the solid line state to the dotted line state. In other words, the flexible members 21$i$ and 21$j$ generate a driving force or a stretching force that widens the interval between the tip portion 23$a$ of the first side support 21$a$ and the tip portion 23$b$ of the second side support 21$b$ in a state in which the optical device 100A is disposed forward of the front frame 21$c$ by a predetermined distance of greater, and urges the optical device 100A forward with respect to the front frame 21$c$. In this case, the optical device 100A can be easily returned to a reference position at which the optical device 100A is advanced forward with respect to the support device 100B. However, in the movable mechanisms 24$a$ and 24$b$, the rotation of the knurled portion 71$h$ can be caused to have an appropriate resistance so as to set a configuration in which the optical device 100A does not automatically return to the original position with respect to the support device 100B. Note that, with regard to the position of the support device 100B, while assuming that the solid line position is the basic position thereof, it is possible to make it easier for the support device 100B to return from the dotted line position to the solid line position by using an initial setting of the shape of the flexible members 21$i$ and 21$j$. Specifically, the flexible members 21$i$ and 21$j$ generate a driving force or a pulling force that narrows the interval between the tip portion 23$a$ of the first side support 21$a$ and the tip portion 23$b$ of the second side support 21$b$ in a state in which the optical device 100A is disposed forward of the front frame 2$c$ by a predetermined distance of greater, thereby biasing the optical device 100A rearward with respect to the front frame 21$c$. In this case, the optical device 100A can be easily returned to the reference position at which the optical device 100A is retracted rearward with respect to the support device 100B.

Figure 8:
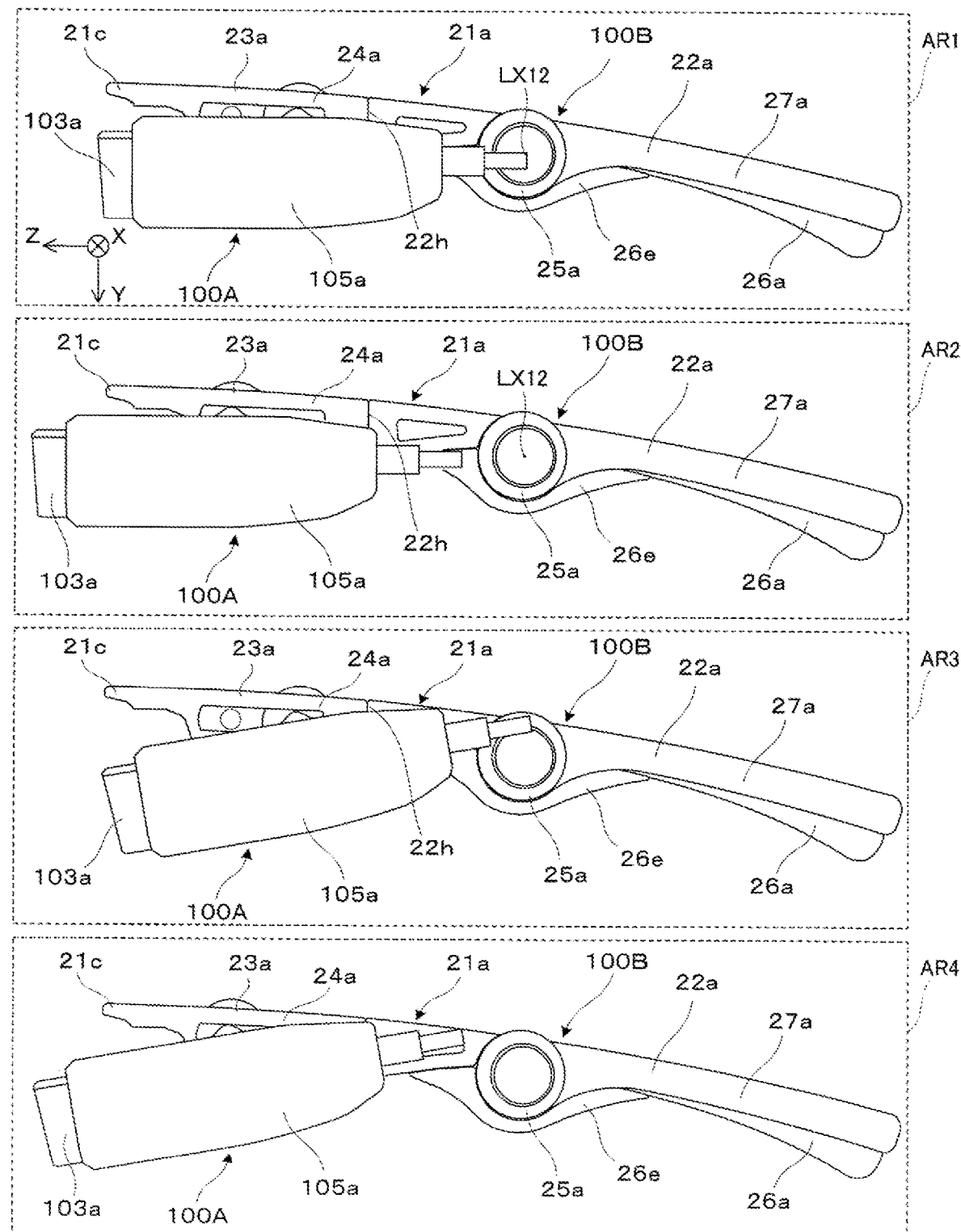
FIG. 8 is a series of side views describing a positioning adjustment of the optical device.

FIG. 8 is a series of side views illustrating relative positional changes including the tilt of the support device 100B with respect to the optical device 100A. In FIG. 8, first to fourth regions AR1 to AR4 illustrate change patterns of the posture of the support device 100B. In an example illustrated in the first region AR1, the optical device 100A is disposed so as to be retracted furthest toward the negative Z direction with respect to the support device 100B, the optical device 100A is substantially horizontally oriented, and the optical device 100A is not tilted. In an example illustrated in the second region AR2, the optical device 100A is disposed so as to be advanced furthest toward the positive Z direction with respect to the support device 100B, and the optical device 100 A is not tilted. In an example illustrated in the third region AR3, the optical device 100A is disposed so as to be retracted furthest in the negative Z direction with respect to the support device 100B, and the front of the optical device 100 A is tilted downward. In an example illustrated in the fourth region AR4, the optical device 100A is disposed so as to be advanced furthest in the positive Z direction with respect to the support device 100B, and the front of the optical device 100A is tilted downward.

Figure 9:
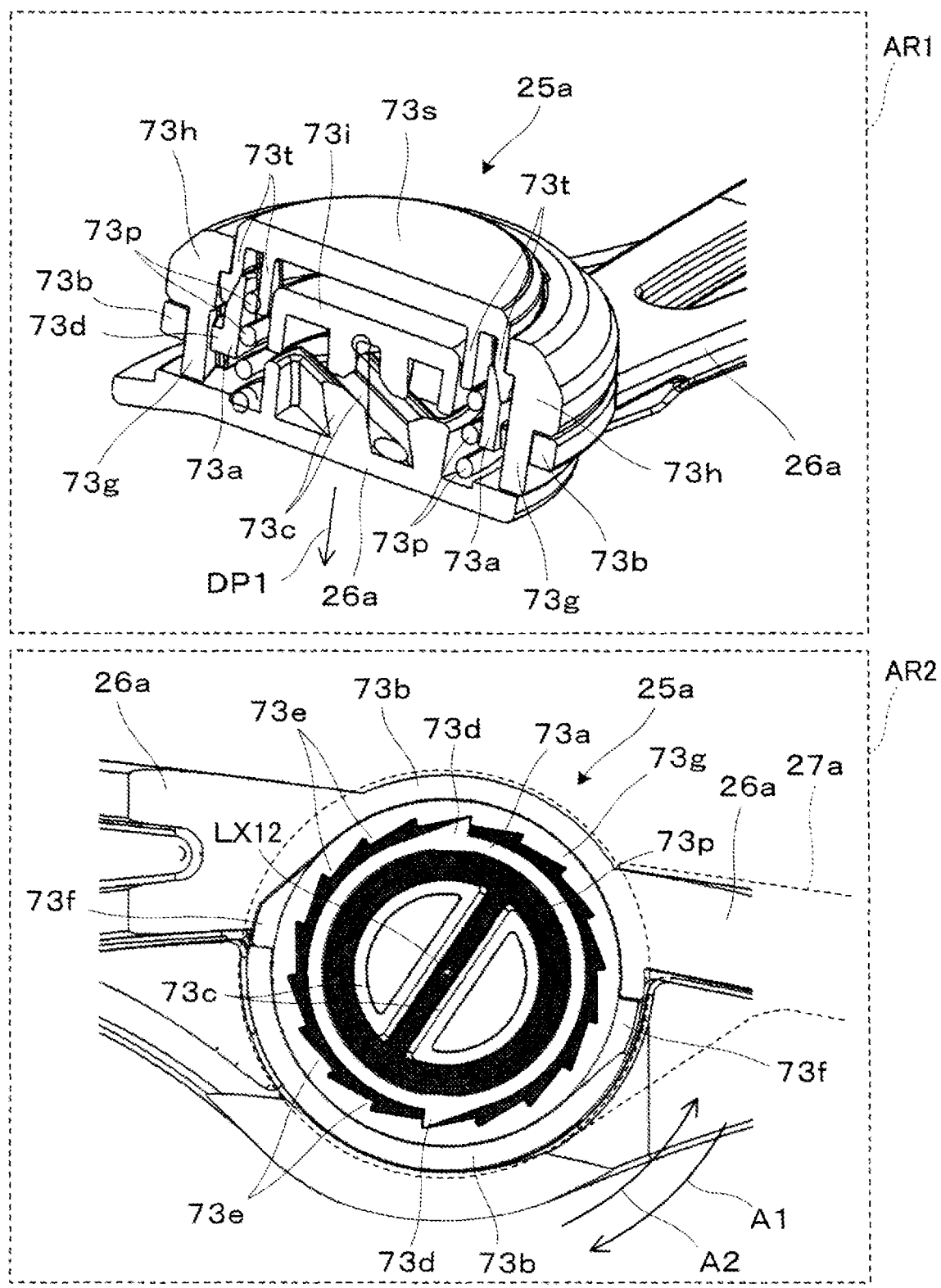
FIG. 9 is a series of diagrams, namely, a perspective view of a cross section viewed from a direction indicated by arrows CC, of the adjustment portion illustrated in FIG. 2, and a cross-sectional view viewed from a direction indicated by arrows DD, of the adjustment portion illustrated in FIG. 2.

FIG. 9 is a series of diagrams illustrating a specific example of the internal structure of the temple adjustment mechanism 25$a$ provided in the first side support 21$a$. In FIG. 9, the first region AR1 is a perspective view observing the interior of the temple adjustment mechanism 25$a$ from a cross section viewed from a direction indicated by arrows CC illustrated in FIG. 2, and a second region AR2 is a cross-sectional view of the temple adjustment mechanism 25$a$ viewed from a direction indicated by arrows DD illustrated in FIG. 2.

In the temple adjustment mechanism 25$a$, an inner annular portion 73$a$ and an outer annular portion 73$b$, which is coaxially disposed with the inner annular portion 73$a$ while being separated outwardly therefrom, are provided on an outer surface of the fixed temple 26$a$ and are supported by the fixed temple 26$a$. A cylindrical portion 73$g$, which is fitted with the inner annular portion 73$a$ and the outer annular portion 73$b$ while being sandwiched therebetween, and a cover 73$h$, which is integrated with the cylindrical portion 73$g$, are provided in a base portion of the movable temple 27$a$ and rotate together with the movable temple 27$a$. Here, ratchet claws 73$d$ protruding outwardly in the radial direction are formed at a plurality of locations on the outer circumference of the inner annular portion 73$a$, and ratchet teeth 73$e$ are formed on the inner circumferential surface of the cylindrical portion 73$g$. The ratchet claws 73$d$ and the ratchet teeth 73$e$ elastically engage with each other in a normal state illustrated in FIG. 9, and allow the cylindrical portion 73$g$ provided with the ratchet teeth 73$e$, namely, the movable temple 27$a$, to rotate in a clockwise direction indicated by an arrow A1, about a rotation axis LX12. In other words, assuming that the movable temple 27$a$ is originally disposed with respect to the fixed temple 26$a$ so as to form the V-shaped angle therebetween, the movable temple 27$a$ can be rotated gradually in stages up to a position at which the movable temple 27$a$ substantially overlaps with the fixed temple 26$a$, forming an angle of approximately 0 degree therebetween. A spring fixing portion 73$c$ is formed on the outer surface of the fixed temple 26$a$ on the center side of the inner annular portion 73$a$, and a spring fixing portion 73$i$ is disposed on the inner side of the cover 73$h$ and supported by the cover 73$h$. Both ends of a coil spring 73$p$ are fixed to the spring fixing portions 73$c$ and 73$i$ and urge the cover 73$h$ and the movable temple 27$a$ to rotate in a counter-clockwise direction indicated by an arrow A2. A release button 73$s$, which is held so as to be fitted into the cover 73$h$, includes a pressing protrusion 73$t$ that engages with the inner annular portion 73$a$ through a gap between the cover 73$h$ and the spring fixing portion 73$i$, and by depressing the release button 73$s$, the ratchet claws 73$d$ provided on the inner annular portion 73$a$ can be caused to be locally displaced so as to be pushed inward, as indicated by an arrow DP1, together with peripheral portions thereof. As a result, the engagement of the ratchet claws 73$d$ with the ratchet teeth 73$e$ is released, and the cylindrical portion 73$g$ provided with the ratchet teeth 73$e$, namely, the movable temple 27$a$ is rotated in the counter-clockwise direction indicated by the arrow A2, receiving a force of the coil spring 73$p$. As a result, the movable temple 27$a$ is reset and caused to be disposed so as to form the V-shaped angle with the fixed temple 26$a$. However, since the maximum value of the rotation angle of the movable temple 27$a$ is limited by a stopper 73$f$ formed on the outer circumferential surface of the cylindrical portion 73$g$, an upper limit is also provided for the angle formed by the movable temple 27$a$ with the fixed temple 26$a$.

In the structure exemplified above, by using the ratchet claws 73$d$ and the ratchet teeth 73$e$, the movable temple 27$a$ is rotated gradually in stages in the clockwise direction indicated by the arrow A1, and fixed. However, by changing the orientation and the like of the ratchet claws 73$d$, the movable temple 27a can also be rotated gradually in stages in the counter-clockwise direction indicated by the arrow A2, and fixed. In this case, a structure is obtained in which the depression of the release button 73s causes the movable temple 27a to be rotated in the clockwise direction indicated by the arrow A1 and return to the position at which the movable temple 27a substantially overlaps with the fixed temple 26a with the angle of approximately 0 degree formed therebetween.

Although a detailed description is omitted here, a mechanical structure of the temple adjustment mechanism 25b provided in the second side support 21b has the same functions as those of the temple adjustment mechanism 25a of the first side support 21a, and the temple adjustment mechanism 25b has a structure obtained by laterally reversing the mechanical structure of the movable mechanism 24a.

Figure 10:
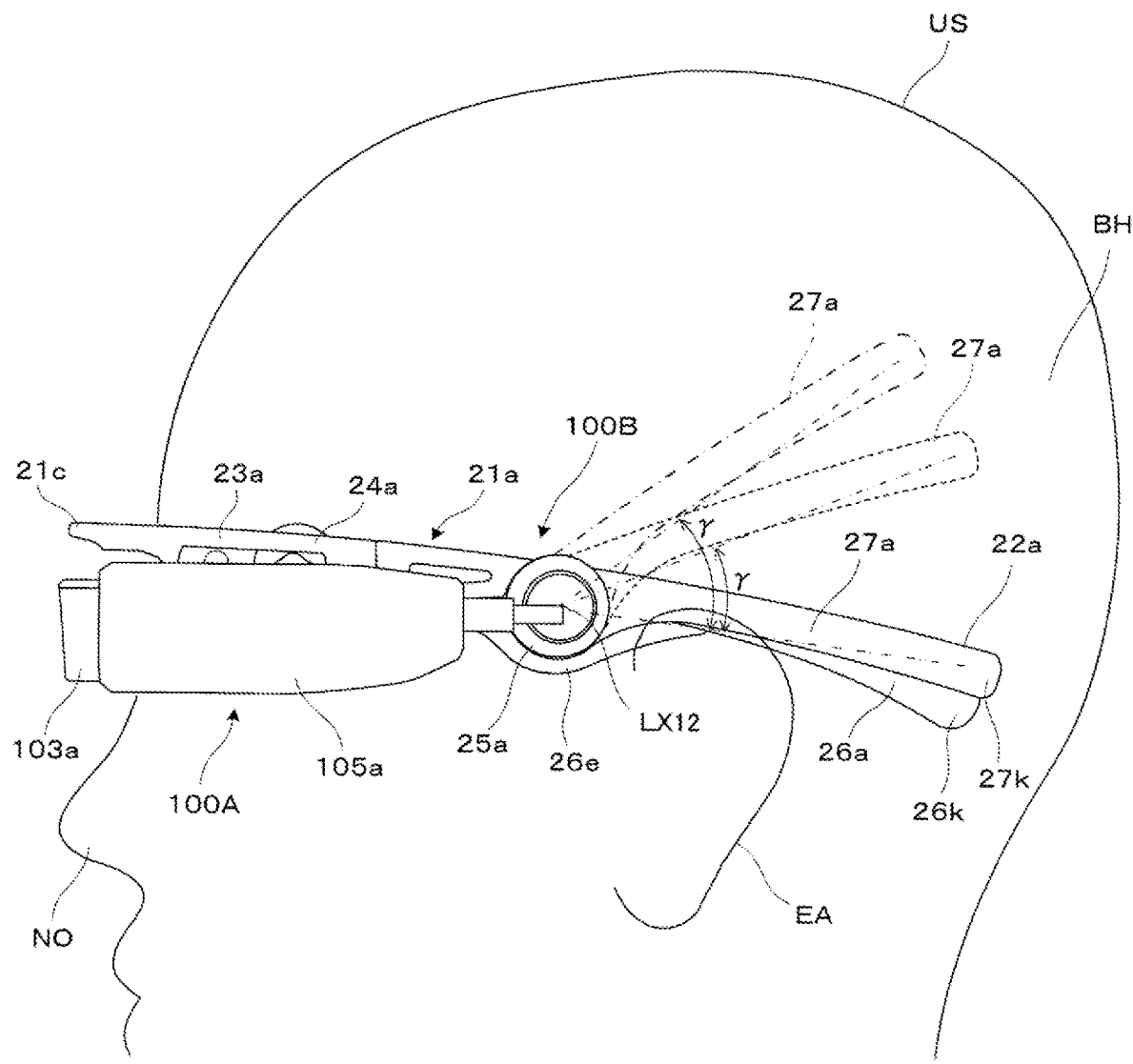
FIG. 10 is a side view describing holding using a movable temple.

FIG. 10 is a diagram illustrating angle changes of the movable temple 27a. The movable temple 27a can change, in stages, an opening angle γ relative to the fixed temple 26a, using the temple adjustment mechanism 25a as a central axis thereof. By fine-tuning the opening angle γ of the movable temple 27a, as indicated by dotted lines, the position of the movable temple 27a can be adjusted with respect to a back of the head BH of the wearer US, and a force can be applied by the movable temple 27a, the force acting so as to lift the movable temple 27a with respect to the first virtual image forming optical portion 103a, using the periphery of the ear pad 26e as a fulcrum. This can prevent an excessive weight from being concentrated on a nose NO and can provide a balanced weighted sensation on an upper portion of an ear EA and the nose NO.

Figure 11:
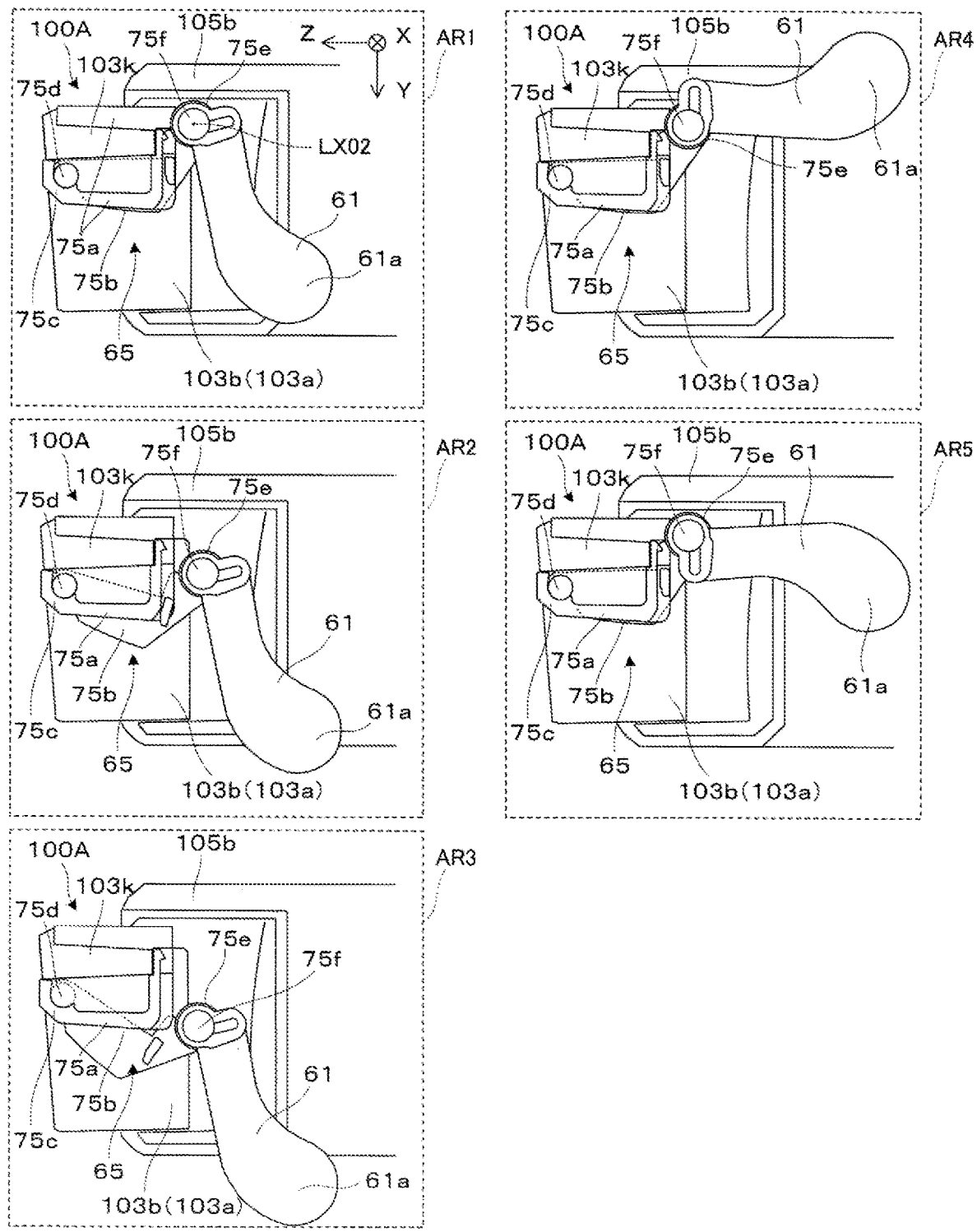
FIG. 11 is a series of cross-sectional views describing a method of adjusting positioning of a nose pad.

FIG. 11 is a series of side views illustrating a specific structure of the pad support device 65 provided in the optical device 100A and a displacement of the nose pad 61 with respect to the optical device 100A. In FIG. 11, first to fifth regions AR1 to AR5 illustrate change patterns of the positioning of the nose pad 61, including the posture thereof.

The pad support device 65 is provided in the bridge portion 103k, which is the center portion sandwiched by the first and second virtual image forming optical portions 103a and 103b. The pad support 65 includes a fixed member 75a fixed to the bridge portion 103k and an arm 75b extending from the fixed member 75a. A bearing 75c that rotatably supports a shaft member 75d provided at the base of the arm 75b is formed on the front end of the fixed member 75a. A bearing 75e that rotatably supports a shaft member 75f provided at the base of the nose pad 61 about a lateral horizontal axis LX02 is formed at the tip of the arm 75b. Although a detailed description is omitted here, a click engagement structure is incorporated between the bearing 75c and the shaft member 75d to achieve a loose lock at a predetermined angle interval, and the rotation angle of the arm 75b with respect to the fixed member 75a can be changed in a plurality of stages. Similarly, although a detailed description is omitted here, a click engagement structure is incorporated between the bearing 75e and the shaft member 75f to achieve a loose lock at a predetermined angle interval, and the rotation angle of the arm 75b with respect to the nose pad 61 can be changed in a plurality of stages. In other words, the postures of the arm 75b and the nose pad 61 can be adjusted by the wearer US applying an external force of a certain amount or greater, but the postures are semi-fixed so that they do not change in a normal wearing state. By adjusting the posture of the arm 75b or the nose pad 61, a tip portion of the nose pad 61 can be freely displaced two-dimensionally along a YZ plane.

Specifically, as illustrated in the first to third regions AR1 to AR3, the height position, that is, the position in the positive and negative Y directions of the nose pad 61 with respect to the bridge portion 103k or the optical device 100A can be changed without changing the posture of the nose pad 61. In addition, as illustrated in the fourth region AR4, the nose pad 61 can be significantly rotated to cause the posture of the nose pad 61 to extend horizontally. As illustrated in the fifth region AR5, the nose pad 61 can be attached to the arm 75b while being vertically inverted. In this case, the bearing 75e provided at the tip of the arm 75b detachably supports the shaft member 75f provided at the base of the nose pad 61.

In the wearable display device 100 of the first embodiment described above, since the interval between the tip portion 23a of the first side support 21a and the tip portion 23b of the second side support 21b is changeable due to the flexible members 21i and 21j, deformation of the support device 100B is allowed and fitability of the wearable display device 100 with respect to the head of the wearer US can be improved. Further, a degree of freedom for positioning the support device 100B with respect to the optical device 100A increases, and as a result, a degree of freedom of a movable state of the optical device 100A with respect to the head of the wearer US can be improved.

Second Embodiment

Hereinafter, a wearable display device according to a second embodiment of the present disclosure will be described. Note that the wearable display device according to the second embodiment is obtained by partially modifying the wearable display device according to the first embodiment, and a description of common portions will be omitted.

Figure 12:
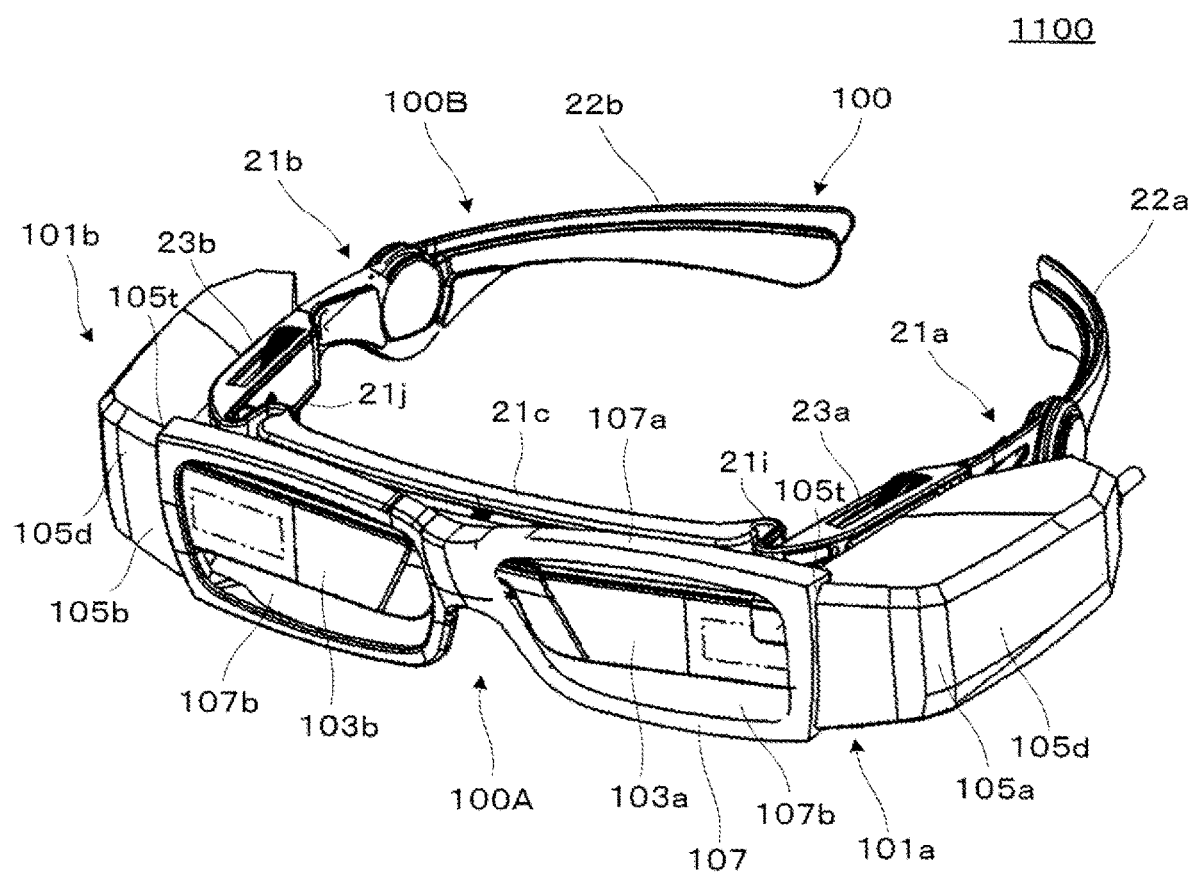
FIG. 12 is a perspective view describing an external appearance of a wearable display device according to a second embodiment.

As illustrated in FIG. 12, a wearable display device 1100 of the second embodiment is the wearable display device 100 illustrated in FIG. 1 and the like, to which a shade 107 is added. The shade 107 is fixed to the optical device 100A by both ends of the shade 107 being inserted so as to be fitted into a fixed groove 105t provided in the outer case 105d of the first image forming main body portion 105a and the fixed groove 105t provided in the outer case 105d of the second image forming main body portion 105b. A filter 107b fixed to a frame 107a of the shade 107 can be an ND filter, for example, but may also be a color filter, a polarizing filter, or the like. The filter 107a is not limited to a filter whose transmittance and the like are kept constant, but may be a filter whose transmittance and the like can be electronically controlled.

Modified Examples and Other Matters

The shapes and structures of the first side support body 21a and the second side support 21b described above are merely exemplary, and the shapes and structures of the side supports 21a and 21b can be changed to an extent that similar functions thereof can be achieved.

The mechanical structures of the movable mechanisms 24a and 24b, the temple adjustment mechanisms 25a and 25b, and the pad support device 65 exemplified above are merely exemplary, and the structures of the movable mechanism 24a and 24b, the temple adjustment mechanisms 25a and 25b, and the pad support device 65 can be changed to an extent that similar functions thereof can be achieved.

The temple adjustment mechanisms 25a and 25b and the pad support device 65 can be omitted. When the temple adjustment mechanisms 25a and 25b are omitted, each of the first temple 22*a* and the second temple 22*b* includes only the fixed temple 26*a*. With regard to the movable mechanism 24*a* and 24*b*, the function thereof as the rotation mechanism 24*r* may be omitted, and each of the movable mechanisms 24*a* and 24*b* can be caused to only function as the movement mechanism 24*s*. For example, a coupling device that detachably couples the fixing temples 26*a* and 26*b* can also be provided.

The flexible members 21*i* and 21*j* are not limited to the spring members 21*x* and 21*y* having the S-shaped external shape, and can be replaced with spring members or spring structures having various shapes, such as an L-shaped spring member or a plate-shaped spring member having a curved R shape. The flexible members 21*i* and 21*j* can not only be the S-shaped spring members, the L-shaped spring members, or the spring members having the R shape, but can also be formed from various elastic bodies made from metal, rubber, plastic, a resin material and the like, or a composite structure thereof. Further, the flexible members 21*i* and 21*j* can have various elastically deformable three-dimensional shapes, including plate-like and rod-like shapes, and the like.

The flexible members 21*i* and 21*j* can be components integrated with both or one of the first side support 21*a* and the front frame 21*c*. Conversely, the flexible members 21*i* and 21*j* can fix the first side support 21*a* or the front frame 21*c* in combination with an additional coupling component. Further, the flexible members 21*i* and 21*j* can not only be formed from a metal material, but can also be formed from a metal core member coated with a resin material.

The flexible member 21*i* can be a spring obtained by bending and processing a metal material such as titanium, for example, and may also be formed by partially inserting a linear spring material, spring steel used for a flat spring, or the like between the tip portions 23*a* and 23*b* and the front frame 21*c* and by processing them all integrally. Further, the flexible member 21*i* may be obtained by coating a stainless spring steel plate with a resin such as plastic, rubber, or the like. The flexible member 21*i* can also be manufactured using a flexible deformable material other than a spring.

In the description above, the display element 80 is the organic EL display panel or the panel for the LCD, but the display element 80 may be a light-emitting display element represented by an LED array, a laser array, a quantum dot light-emitting element, and the like. Further, the display element 80 may be a display using a laser scanner that combines a laser light source and a scanner. Note that instead of the LCD panel, a liquid crystal on silicon (LCOS) technology can also be used.

The virtual image forming optical portions 103*a* and 103*b* may be such portions that block external light by covering the front of the eyes. In this case, the external world cannot be directly observed, but the external world image captured by a camera can be caused to be observable.

The electronic printed wired boards 41 and 42 can be caused to have various functions that are not limited to the functions described in the embodiments.

A first wearable display device according to a specific mode includes an optical device configured to form a virtual image, and a support device configured to support the optical device. The support device includes a first side support including a first temple, a second side support including a second temple, and a front frame extending between tip portions of the first side support and the second side support. The support device includes a flexible member between the tip portion of the first side support and a first end of the front frame and a flexible member between the tip portion of the second side support and a second end of the front frame. The flexible members cause an interval between the tip portion of the first side support and the tip portion of the second side support to be changeable.

In the above-described wearable display device, since the interval between the tip portion of the first side support and the tip portion of the second side support is changeable due to the flexible members, deformation of the support device is allowed and fittability of the wearable display device to the head of a wearer can be improved. Further, a degree of freedom for positioning the support device with respect to the optical device increases, and as a result, a degree of freedom of a movable state of the optical device with respect to the head of the wearer can be improved.

According to a specific aspect, the support device supports the optical device via a shaft member provided on an outer case of the optical device and protruding from the outer case.

According to another aspect, the support device includes a movable mechanism in the tip portion of the first side support and in the tip portion of the second side support, the movable mechanism movably supporting the optical device in a front-rear direction corresponding to an optical axis direction. In this case, a distance from the eyes to the optical device can be adjusted by the movable mechanisms.

According to yet another aspect, the movable mechanisms narrow the interval between the tip portion of the first side support and the tip portion of the second side support when the support device is moved forward relative to the optical device. In this case, by moving the support device relatively forward, the interval between the pair of tip portions is narrowed, and by moving the support device relatively rearward, the interval between the pair of tip portions is widened.

According to yet another aspect, the flexible members generate a pulling force that narrows the interval between the tip portion of the first side support and the tip portion of the second side support in a state in which the optical device is disposed forward of the front frame by a predetermined distance of greater, thereby biasing the optical device rearward with respect to the front frame. In this case, the optical device can be easily returned to a reference position at which the optical device is retracted rearward with respect to the support device.

According to yet another aspect, the support device includes a rotation mechanism at the tip portion of the first side support and at the tip portion of the second side support, the rotation mechanism rotatably supporting the optical device about a lateral axis orthogonal to an optical axis. In this case, a tilt posture of the optical device and the height of the optical device with respect to the front frame can be adjusted.

According to yet another aspect, the rotation mechanism has a click engagement structure that is coupled to a shaft member provided on an outer case of the optical device and protruding from the outer case along the lateral axis, the click engagement structure being configured to hold a rotational posture of the optical device.

According to yet another aspect, when the tip portion of the first side support, the tip portion of the second side support, and the front frame extend substantially along a reference plane, the flexible members includes a first spring member and a second spring member each having cross sections relatively long in a direction orthogonal to the reference plane and each extending along the reference plane. The first spring member couples the tip portion of the first side support with the first end of the front frame, and the second spring member couples the tip portion of the second side support with the second end of the front frame. In this case, the first spring member and the second spring member are formed as flat spring-shaped coupling members, and can increase a degree of freedom for an adjustment of the interval and the like, with a simple structure.

According to yet another aspect, the first spring member and the second spring member are formed of a material containing a resin.

According to yet another aspect, the first wearable display device further includes a nose pad attached to the optical device at a position corresponding to a center of the front frame, and a pad support device provided between the optical device and the nose pad and configured to set a position of the nose pad while keeping the position changeable. In this case, it becomes easy to adjust the height of the optical device with respect to the face of the wearer and the interval.

According to yet another aspect, the pad support device sets a distance from the optical device to the nose pad and a rotational posture of the nose pad.

A second wearable display device according to a specific mode includes an optical device configured to form a virtual image, and a support device configured to support the optical device. The support device includes a first side support including a first temple, a second side support including a second temple, and a front frame extending between tip portions of the first side support and the second side support. The support device includes a movement mechanism that movably supports the optical device in a front-rear direction corresponding to an optical axis direction.

In the above-described wearable display device, since the support device includes the movement mechanism that movably supports the optical device in the front-rear direction corresponding to the optical axis direction, a distance from the eyes to the optical device can be adjusted by the movement mechanism.

According to a specific aspect, the movement mechanism is a movable mechanism that movably supports the optical device in the front-rear direction corresponding to the optical axis direction in the tip portion of the first side support and in the tip portion of the second side support, and rotatably supports the optical device about a lateral axis orthogonal to an optical axis.

According to another aspect, the support device includes a flexible member between the tip portion of the first side support and a first end of the front frame and a flexible member between the tip portion of the second side support and a second end of the front frame, and the flexible members cause an interval between the tip portion of the first side support and the tip portion of the second side support to be changeable.

What is claimed is:

1. A wearable display device comprising:
an optical device configured to form a virtual image; and
a support device configured to support the optical device, wherein
the support device includes a first side support including a first temple, a second side support including a second temple, and a front frame extending between tip portions of the first side support and the second side support,
the support device includes a flexible member between the tip portion of the first side support and a first end of the front frame and between the tip portion of the second side support and a second end of the front frame,
the flexible member causes an interval, between the tip portion of the first side support and the tip portion of the second side support, to be changeable, and
the support device includes a movable mechanism movably supporting, at the tip portion of the first side support and at the tip portion of the second side support, the optical device in a front-rear direction corresponding to an optical axis direction.

2. The wearable display device according to claim 1, wherein
the support device supports the optical device through a shaft member provided at an outer case of the optical device and protruding from the outer case.

3. The wearable display device according to claim 1, wherein
the movable mechanism narrows the interval between the tip portion of the first side support and the tip portion of the second side support when the support device moves forward relative to the optical device.

4. The wearable display device according to claim 3, wherein
the flexible member generates a pulling force that narrows the interval between the tip portion of the first side support and the tip portion of the second side support, in a state in which the optical device is disposed forward of the front frame by a predetermined distance or greater, thereby biasing the optical device rearward with respect to the front frame.

5. The wearable display device according to claim 1, wherein
the support device includes a rotation mechanism supporting, at the tip portion of the first side support and at the tip portion of the second side support, the optical device rotatably about a lateral axis orthogonal to an optical axis.

6. The wearable display device according to claim 5, wherein
the rotation mechanism has a click engagement structure that is coupled to a shaft member provided at an outer case of the optical device and protruding from the outer case along the lateral axis, the click engagement structure being configured to hold a rotational posture of the optical device.

7. The wearable display device according to claim 5, wherein
when the tip portion of the first side support, the tip portion of the second side support, and the front frame extend substantially along a reference plane, the flexible member includes a first spring member and a second spring member each having cross sections relatively long in a direction orthogonal to the reference plane and each extending along the reference plane,
the first spring member couples the tip portion of the first side support with the first end of the front frame, and
the second spring member couples the tip portion of the second side support with the second end of the front frame.

8. The wearable display device according to claim 7, wherein
the first spring member and the second spring member are formed of a material containing a resin.

9. The wearable display device according to claim 1, comprising:
a nose pad attached to the optical device at a position corresponding to a center of the front frame, and a pad support device provided between the optical device and the nose pad and configured to set a position of the nose pad while keeping the position changeable.

10. The wearable display device according to claim 9, wherein
the pad support device sets a distance from the optical device to the nose pad and a rotational posture of the nose pad.

11. A wearable display device comprising:
an optical device configured to form a virtual image; and
a support device configured to support the optical device, wherein
the support device includes a first side support including a first temple, a second side support including a second temple, and a front frame extending between tip portions of the first side support and the second side support, and
the support device includes a movement mechanism that movably supports the optical device in a front-rear direction corresponding to an optical axis direction.

12. The wearable display device according to claim 11, wherein
the movement mechanism is a movable mechanism that movably supports the optical device, in the front-rear direction corresponding to the optical axis direction, at the tip portion of the first side support and at the tip portion of the second side support, and supports the optical device rotatably about a lateral axis orthogonal to an optical axis.

13. The wearable display device according to claim 11, wherein
the support device includes a flexible member between the tip portion of the first side support and a first end of the front frame and between the tip portion of the second side support and a second end of the front frame, and
the flexible member causes an interval, between the tip portion of the first side support and the tip portion of the second side support, to be changeable.

* * * * *